Sept. 6, 1966   J. W. QUALMAN   3,270,584
TRANSMISSION
Filed Sept. 27, 1963
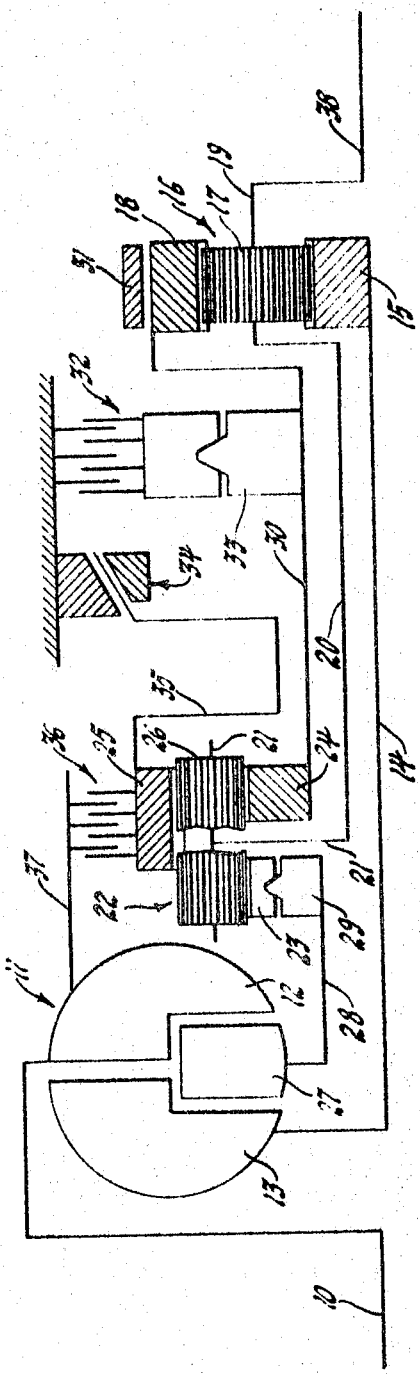
INVENTOR.
Jack W. Qualman
BY
R. L. Spencer
ATTORNEY

United States Patent Office 3,270,584
Patented Sept. 6, 1966

3,270,584
TRANSMISSION
Jack W. Qualman, Ann Arbor, Mich., assignor to General Motors Corporation, Detroit, Mich., a corporation of Delaware
Filed Sept. 27, 1963, Ser. No. 312,192
5 Claims. (Cl. 74—677)

This invention relates to transmissions and more particularly to an improved design of a step-ratio transmission gearing and hydrodynamic torque transmitting unit.

The improved gearing and hydrodynamic torque transmitting arrangement incorporates two gearing units and a hydrodynamic torque converter unit having first and second turbines operably connected to first and second gear units, respectively, in such manner that one of the two turbines functions in the normal manner of a torque converter reactor member in forward drive and functions both as a power input turbine and as a torque converter reactor member when operating in reverse drive to increase the torque or transmission drive ratio in reverse.

An object of this invention is to provide a transmission incorporating step-ratio gearing and a hydraulic torque converter wherein the torque converter incorporates a stator or reaction member which is grounded when operating in first gear forward drive and permitted to rotate when operating in reverse drive to impart torque to the gearing.

Another object of this invention is to provide a transmission incorporating step-ratio gearing and a hydraulic torque converter wherein the reactor member of the torque converter is grounded to a gear of the gearing unit by means of a one-way brake.

An additional object of this invention is to provide a hydraulic torque converter and planetary gearing assembly wherein the torque converter reaction member is grounded against reverse rotation when operating in low gear forward drive and is permitted to rotate reversely at a speed determined by the planetary gearing when operating in reverse such that the torque converter reaction member functions both as a hydraulic reaction member and as a power input turbine for imparting torque by direct mechanical connection to the gearing when operating in reverse.

A further object of this invention is to provide a hydrodynamic torque converter and planetary gearing assembly incorporating first and second gear units wherein a turbine of the torque converter is fixed for rotation with a power input gear of a first gear unit and wherein a second gear unit includes a first gear connected for rotation with a gear of the first gear unit and a second gear connected to the torque converter reaction member.

A more specific object of this invention is to provide a torque converter planetary gearing combination wherein a turbine of the torque converter is connected to a sun gear of a first gear unit, wherein a ring gear of the first gear unit is connected to a sun gear of a second gear unit, and wherein the torque converter reaction member is grounded to a sun gear of the second gear unit by means of a one-way brake.

These and other objects and advantages of this invention will be apparent from the following specification and claims taken in conjunction with the accompanying drawing, in which:

The single figure is a schematic diagram of a transmission constructed in accordance with the principles of this invention.

Referring to the drawing, there is shown a transmission constructed in accordance with the principles of this invention wherein an engine driven power input shaft 10 drives an impeller 12 of a hydrodynamic torque transmitting unit indicated generally at 11 at engine speed. A first turbine 13 is connected to a sun gear 15 of a first gear unit indicated generally at 16 by a shaft 14 such that turbine 13 and sun gear 15 rotate as a unit. Gear unit 16 includes a planet pinion gear 17 in mesh with a ring gear 18 and sun gear 15 and supported upon a planet carrier 19. A final power delivery shaft 38 is driven by carrier 19. A hollow sleeve shaft 20 through which shaft 14 extends connects carrier 19 to a planet carrier 21 of a second gear unit indicated generally at 22 such that carrier 19, carrier 21 and final power delivery shaft 38 rotate as a unit. Gear unit 22 includes first and second sun gears 23 and 24 and a ring gear 25 in mesh with a planet pinion gear 26 supported in planet carrier 21.

A bladed hydraulic reactor 27 is disposed between the fluid delivery side of turbine 13 and the fluid entrance to impeller 12 and normally functions to redirect fluid into the impeller 12 in a conventional manner. Reactor 27 is connected to sun gear 23 by means of a hollow sleeve shaft 28 and a one-way brake 29. A hollow sleeve shaft 30 concentric with shafts 14 and 20 connects ring gear 18 to sun gear 24 such that the two gears rotate as a unit and cannot rotate relative to each other. A disc brake indicated generally at 32 is disposed in series with a one-way brake 33, the two brakes being effective to prevent rotation of sleeve shaft 30 in one direction and to permit rotation of shaft 30 in the opposite direction when brake 32 is engaged. Brake 32 may be termed a forward brake and is engaged to provide forward drive through the transmission. A reverse cone brake indicated generally at 34 may be engaged to prevent rotation of a sleeve shaft 35 fixed to ring gear 25. A clutch 36 may be engaged to clutch ring gear 25 to impeller 12 through a rotatable housing 37 rotatable with impeller 12. Planet carrier 19 and planet carrier 21 each rotate at the speed of final power delivery shaft 38 and provide the power path to shaft 38.

The hydrodynamic torque transmitting unit 11 is of the type adapted to be selectively filled with and emptied of working fluid and is filled with fluid in first or low gear drive, direct drive forward, and reverse. Unit 11 is emptied of working fluid in second gear forward drive. Brakes 31, 32 and clutch 36 are fluid pressure actuated. Brake 31 is an overrun brake for preventing both forward and reverse rotation of ring gear 18 and sun gear 24.

In operation, the hydrodynamic coupling unit 11, clutch 36, brake 34, brake 32 and brake 31 may be controlled by a fluid pressure supply and control system of the type shown in the application of August H. Borman, Jr., et al., Serial No. 57,189, filed Sept. 20, 1960, now U.S. Patent No. 3,132,535, and accordingly the hydraulic control system is not shown in the present application. It is believed adequate for the purposes of this application to state that clutch 36, brake 34, brake 32 and brake 31 may be engaged by fluid pressure responsive servos (not shown) and that hydrodynamic unit 11 may be alternately filled and emptied of working fluid under control of valving (not shown) as shown in the said Borman et al. application.

For neutral or no drive operation brake 32, which may be termed a forward brake, brake 34 which may be termed a reverse brake, overrun brake 31 and second speed clutch 36 are released. Since there is no reaction point in the transmission, no power can be transmitted to power delivery shaft 38.

For first or low gear forward drive, forward brake 32 is engaged and hydrodynamic unit 11 is filled with working fluid. Turbine 13 drives sun gear 15. One-way brake 33 prevents reverse rotation of ring gear 18, sleeve shaft 30 and sun gear 24. With ring gear 18 as a reaction point, sun gear 15 drives carrier 19, sleeve shaft 20, carrier 21 and power delivery shaft 38 forwardly in reduction drive of gear unit 16. In addition, it will be noted that sun gear 24 and sun gear 23 both of which mate with planet pinion 26 of gear unit 22 each have the same number of teeth and cannot rotate relative to each other. With sun gear 24 held against reverse rotation by disc brake 32 and one-way brake 33, the sun gear 23 will also be prevented from rotating reversely. Due to the effect of circulating working fluid in hydrodynamic unit 11, the turbine 27 will tend to rotate backwardly with respect to the direction of rotatiton of impeller 12 and turbine 13. Such rotation is prevented by one-way brake 29 which locks up to sun gear 23, the sun gear 23 being stationary in first gear reduction drive. Thus in first gear drive, the reactor 27 functions as a normal torque converter reactor to redirect fluid from the discharge of turbine 13 to the entrance to impeller 12. In first gear drive the reduction is a function of the gear reduction of gear unit 16 and hydrodynamic unit 11, and the reactor member 27 is stationary.

For second gear drive, unit 11 is emptied of working fluid and clutch 36 is engaged. Brake 32 remains engaged. Power input is to ring gear 25 through clutch 36. One-way brake 33 locks up to prevent reverse rotation of sun gear 24 and sun gear 24 serves as the reaction point for gear unit 22. Drive in second gear is entirely mechanical at the drive ratio of gear unit 22.

For direct drive, clutch 36 remains engaged, brake 32 remains engaged and unit 11 is filled with working fluid. Turbine 13 drives sun gear 15 of gear unit 16 substantially at engine speed. Ring gear 25 is driven at engine speed through clutch 36. Reactor 27 spins freely forwardly to the direction of rotation of impeller 12 and turbine 13 with one-way brake 29 released. Since ring gear 18 and sun gear 24 are fixed to each other, the effect of driving sun gear 15 is the same as driving sun gear 24 at engine speed and direct drive is obtained.

For reverse drive forward brake 32 is released, reverse brake 34 is engaged and unit 11 is filled with working fluid. Sun gear 15 is driven forwardly by turbine 13. Due to the load of the vehicle on planet carrier 19, sun gear 15 tends to drive ring gear 18 and sun gear 24 in reverse such that sun gear 23 likewise rotates in reverse at the same speed as sun gear 24. Due to the action of hydraulic fluid in unit 11, reactor member 27 tends to rotate in reverse and acts as a turbine to impose reverse torque on sun gear 23 through one-way brake 29. Thus, in reverse operation reverse torque is applied as the sum of the gear ratio and hydrodynamic torque multiplication arising through action of unit 11 and including the reverse torque applied to sun gear 23 by reactor 27 which functions both as a reversely rotating reaction member and as a hydraulic turbine when operating in reverse.

The heretofore described arrangement wherein the hydrodynamic unit functions to multiply torque in forward first and third or direct forward drive and wherein the reactor 27 functions both as a rearwardly rotating reaction member and as a turbine in reverse drive provides a relatively simple gearing structure providing a desirable increase of output ratio over standard arrangements when operating in reverse drive. Sun gear 24 is driven backward by gear unit 16 and sun gear 23 likewise rotates backward to permit member 27 to rotate backward and apply torque input to gear unit 22 acting in assistance to torque input to gear unit 22 by gear unit 16 through sun gear 24. At the same time, the reaction function of reactor 27 in redirecting fluid into impeller 12 tending to drive impeller 12 forwardly is not lost since the speed of rotation of reactor 27 is controlled to the same speed of rotation in reverse as that of sun gear 24. Thus member 27 retains its function as a torque converter reactor in that hydrodynamic torque multiplication is obtained and also functions as a hydraulic turbine to impart reverse torque to sun gear 23 through one-way brake 29 when operating in reverse. For forward low gear drive member 27 remains stationary and functions solely as a reaction member. In direct drive member 27 will normally rotate forward freely with one-way brake 29 released, but at low speed direct drive with large power input, member 27 may be held against reverse rotation by sun gear 23 with one-way brake 29 locked up. The arrangement wherein the reactor 27 is connected to sun gear 23 by one-way brake 29 so as to be held against reverse rotation in low gear forward drive and to provide geared reverse rotation of reactor 27 in reverse drive is believed novel.

I claim:

1. In a transmission of the type having a hydrodynamic torque transmitting device and first and second planetary gearing units, said hydrodynamic device including an engine driven impeller and a first turbine and a reaction member, said first planetary gearing unit including a planet carrier supporting a planet pinion gear in mesh with a ring gear and a sun gear, said second planetary gearing unit including a planet carrier supporting a planet pinion gear in mesh with a ring gear and first and second sun gears, respectively, means connecting said turbine to said first gear unit sun gear for driving the same, a power delivery shaft, means connecting the carriers of both gear units to said power delivery shaft for rotation therewith, means connecting the ring gear of said first gear unit to one sun gear of said second gear unit for rotation therewith, means operatively connecting said reaction member of said hydrodynamic device to a sun gear of said second gear unit whereby said last-mentioned sun gear provides a reaction point for said reaction member and brake means effective when engaged for preventing rotation of one of said second gear unit sun gears in at least one direction of rotation.

2. In a transmission of the type having a hydraulic torque converter and first and second planetary gearing units, said hydraulic converter including an engine driven impeller and a first turbine and a reaction member, said first planetary gearing unit including a planet carrier supporting a planet pinion gear in mesh with a ring gear and a sun gear, said second planetary gearing unit including a planet carrier supporting a planet pinion gear in mesh with a ring gear and first and second sun gears, respectively, a drive connection between said turbine and said first gear unit sun gear for driving said gear in response to rotation of said turbine, a final power delivery shaft, means connecting said carriers to each other and to said final power delivery shaft for rotation as a unit, means connecting the ring gear of said first gear unit to said first sun gear of said second gear unit for rotation therewith as a unit, means including a one-way brake disposed between said reaction member and said second sun gear of said second gear unit for transmitting reaction torque from said reaction member to said last-mentioned sun gear, and brake means effective when engaged for preventing rotation of said first sun gear of said second gear unit in at least one direction of rotation.

3. In a transmisison of the type having a hydraulic torque converter and first and second planetary gearing units, said hydraulic torque converter including an engine driven impeller, a turbine and a reaction member, said first gearing unit including a planet carrier supporting a planet pinion gear in mesh with a ring gear and a sun gear, said second gearing unit including a second planet carrier supporting a second planet pinion gear in mesh with a ring gear and first and second sun gears, respectively, means connecting said turbine to said first gear unit sun gear for driving said sun gear, means connecting the ring gear of said first gear unit to the first sun gear of said second gear unit for rotation therewith as a unit, means disposed between said reaction member and said second sun gear of said second gear unit for grounding said reaction member to said second sun gear whereby said reaction member is prevented from rotating reversely with respect to said second sun gear, a final power delivery shaft, means connecting said carriers to each other and said power delivery shaft for rotation therewith as a unit, means for establishing reduction forward drive including said torque converter and brake means effective to prevent reverse rotation of said first gear unit ring gear and both of said second gear unit sun gears, and means for establishing reverse drive including said torque converter and brake means for preventing rotation of said second gear unit ring gear.

4. In a transmission of the type having a hydraulic torque converter and first and second planetary gearing units, said torque converter including an engine driven impeller, a turbine and a reaction member, said first gear unit including a planet carrier supporting a planet pinion in mesh with a ring gear and a sun gear, said second gear unit including a planet carrier supporting a planet pinion in mesh with a ring gear and first and second sun gears, respectively, a power delivery shaft, means connecting both of said carriers to said shaft for rotation therewith as a unit, means connecting said turbine to said first gear unit sun gear, means connecting said first gear unit ring gear to the first sun gear of said second gear unit, means for grounding said reaction member to the second sun gear of said second gear unit, means for establishing reduction forward drive including an engageable and releasable brake effective when engaged to prevent reverse rotation of said first gear unit ring gear and both sun gears of said second gear unit, and means effective to establish reverse drive including a second engageable and releasable brake effective when engaged to prevent rotation of said second gear unit ring gear, said sun gears of said second gear unit being rotated reversely at the drive ratio of said gearing and said reaction member being rotated at the same speed of rotation of said second gear unit sun gears to impart reverse torque to said gearing upon establishment of reverse drive 5. In a transmission of the type having a hydraulic torque converter and first and second planetary gearing units, said torque converter including an engine driven impeller, a turbine and a reaction member, said first gear unit including a planet carrier supporting a planet pinion in mesh with a sun gear and a ring gear, a shaft connecting said turbine to said sun gear for driving said sun gear, said second gear unit including a planet carrier supporting a pinion gear in mesh with a ring gear and first and second sun gears, respectively, a power delivery shaft, means connecting said delivery shaft to both of said planet carriers whereby said carriers and said power delivery shaft rotate as a unit, means connecting said first gear unit ring gear to the first sun gear of said second gear unit whereby said ring gear and sun gear rotate as a unit, means for preventing reverse rotation of said reaction member with respect to the second sun gear of said second gear unit and for permitting forward rotation of said reaction member with respect to said last-mentioned sun gear including a one-way brake, means for establishing reduction forward drive through said converter and gearing including a brake effective when engaged to prevent reverse rotation of said first gear unit ring gear and both of said second gear unit sun gears, and means for establishing reverse drive through said gearing and said torque converter including a second brake effective when engaged to prevent rotation of said second gear unit ring gear, both of said second gear unit sun gears and said torque converter reaction member being rotated in reverse at a speed determined by said gearing upon establishment of reverse drive.

References Cited by the Examiner
UNITED STATES PATENTS

| | | | |
|---|---|---|---|
| 2,657,592 | 11/1953 | Burnett | 74—677 |
| 2,890,602 | 6/1959 | Smirl et al. | 74—677 |
| 2,905,025 | 9/1959 | Karlsson et al. | 74—677 |
| 2,961,895 | 11/1960 | Holdeman | 74—677 |
| 3,021,727 | 2/1962 | Kelley et al. | 74—677 |
| 3,030,823 | 4/1962 | Kelley | 74—677 |
| 3,055,232 | 9/1962 | Dodge | 74—677 |
| 3,141,355 | 7/1964 | Gabriel | 74—677 |

DAVID J. WILLIAMOWSKY, *Primary Examiner.*

T. C. PERRY, *Assistant Examiner.*